United States Patent [19]

Russ et al.

[11] Patent Number: 5,556,435
[45] Date of Patent: Sep. 17, 1996

[54] MIXTURES FIBER-REACTIVE DYES AND USE THEREOF FOR DYEING FIBER

[75] Inventors: Werner H. Russ, Flörsheim; Kurt Hussong, Bad Soden; Karl Krieger, Hünstetten; Uwe Mrotzeck, Kelkheim, all of Germany

[73] Assignee: Hoechst AG, Germany

[21] Appl. No.: 433,700

[22] Filed: May 2, 1995

[30] Foreign Application Priority Data

May 2, 1994 [DE] Germany .................. 44 15 313.9

[51] Int. Cl.$^6$ .................. D06P 1/38; C09B 67/22
[52] U.S. Cl. .................. 8/549; 8/641; 8/682; 8/688; 8/687
[58] Field of Search .................. 8/549, 641, 688, 8/682, 687, 917–925

[56] References Cited

U.S. PATENT DOCUMENTS

| | | | |
|---|---|---|---|
| 4,485,041 | 11/1984 | Hoyer et al. | 534/637 |
| 4,649,193 | 3/1987 | Meininger et al. | 534/622 |
| 4,693,725 | 9/1987 | Yamauchi et al. | 8/527 |
| 5,176,717 | 1/1993 | Schaulin et al. | 8/437 |
| 5,200,511 | 4/1993 | Loeffer et al. | 534/634 |
| 5,232,462 | 8/1993 | Tzikas . | |
| 5,290,922 | 3/1994 | Springer et al. | 534/642 |
| 5,330,539 | 7/1994 | Phillips et al. | 8/549 |
| 5,451,665 | 9/1995 | Tzikas . | |

FOREIGN PATENT DOCUMENTS

| | | |
|---|---|---|
| 0478503A2 | 4/1992 | European Pat. Off. . |
| 2-202956 | 8/1990 | Japan . |
| 2007698 | 5/1979 | United Kingdom . |
| 2008143 | 5/1979 | United Kingdom . |

OTHER PUBLICATIONS

European Search Report No. 95106234.8, Dec. 4, 1995.
Chemical Abstracts 114, No. 8, abstract no. 64186v (Feb. 25, 1991).

*Primary Examiner*—Margaret Einsmann
*Attorney, Agent, or Firm*—Connolly and Hutz

[57] ABSTRACT

Mixtures of fiber-reactive dyes in brilliant orange to red shades comprise one or more disazo dyes of the formula

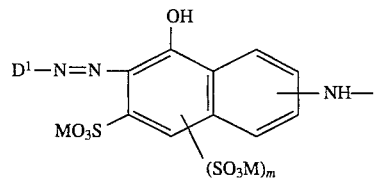

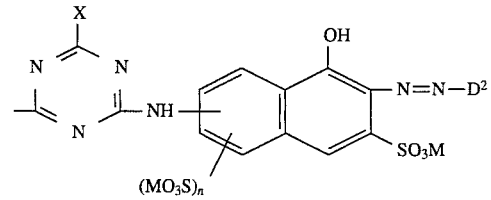

and one or more monoazo dyes of the formula

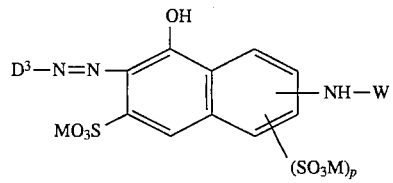

in which: $D^1$ $D^2$ and $D^3$, which are identical to or different from one another, are phenyl or 2-naphthol substituted by vinylsulfone, vinylsulfone, M is hydrogen or an alkali metal, m, n and p are zero or 1, X is chlorine, fluorine, hydroxy, cyanoamino or lower alkylamino, with W being a 2-chloro- or 2-fluoro-s-triazin-6-yl radical which is substituted in position 4 by chlorine, hydroxy, phenoxy, morpholino or by a radical corresponding to one of the definitions of $D^1$ or by a phenyl radical, which may be substituted by sulfo, carboxy, methyl, ethyl, methoxy, ethoxy and/or hydroxy, or $D^3$ and W are as further described in the specification.

5 Claims, No Drawings

MIXTURES FIBER-REACTIVE DYES AND USE THEREOF FOR DYEING FIBER

The invention is in the technical field of fiber-reactive dyes.

With the present invention, novel dye mixtures have been found which are capable of dyeing hydroxy—and/or carboxamido-containing fiber materials, such as cellulose fiber materials and wool, in brilliant orange to red shades. The mixtures comprise one or more, such as 2, 3 or 4, disazodyes of the formula (1) and one or more, such as 2 or 3, monoazo dyes of the formula (2A) or (2B) or (2C) or a mixture of these monoazo dyes.

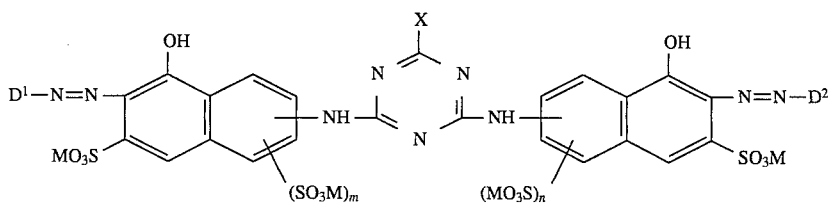
(1)

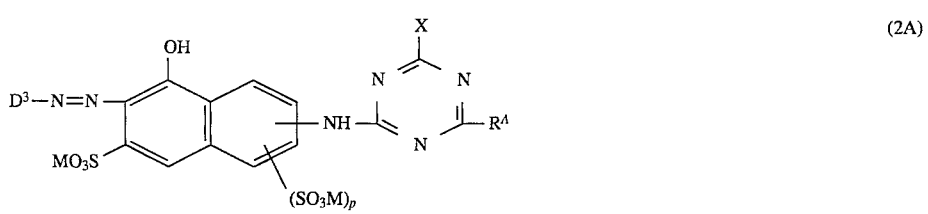
(2A)

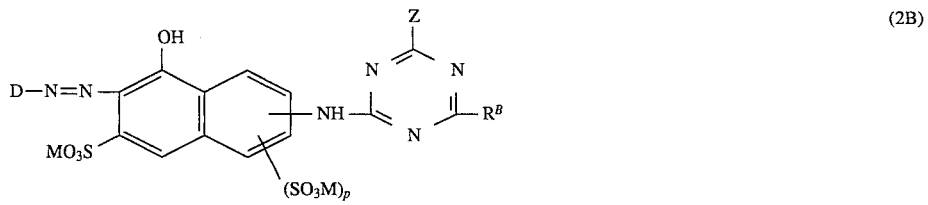
(2B)

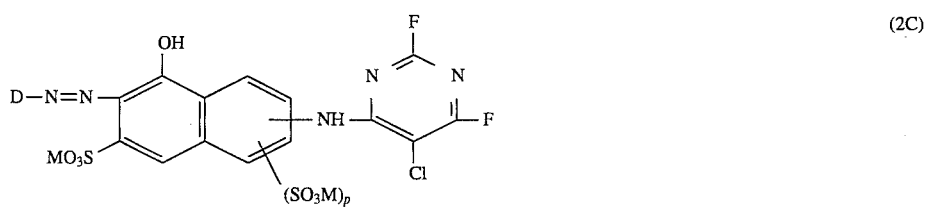
(2C)

The dyes of the formula (1) are present in a quantity of from 95 to 50% by weight, the dyes of the formulae (2) in a quantity of from 5 to 50% by weight, based in each case on the overall quantity of these dyes of the formulae (1) and (2) in the mixtures.

In these formulae:

M is hydrogen or an alkali metal such as sodium, potassium or lithium;

$D^1$ is a group of the formula (2a) or (2b)

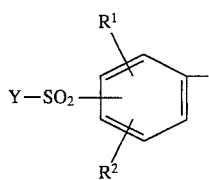
(2a)

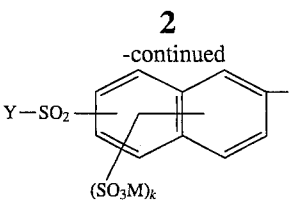
(2b)

in which $R^1$ is hydrogen, methyl, ethyl, methoxy, ethoxy, sulfo or carboxy, preferably hydrogen, $R^2$ is hydrogen, methyl, ethyl, methoxy, ethoxy or sulfo, preferably hydrogen or methoxy, especially hydrogen, Y is vinyl or is ethyl containing in the β-position a substituent which can be eliminated by alkali to form the vinyl group, M is as defined above, and k is the number zero, 1 or 2 (where if k is zero this group is hydrogen);

$D^2$ has one of the meanings given for $D^1$;

$D^3$ has one of the meanings given for $D^1$;

D is a group of the formula (3a) or (3b)

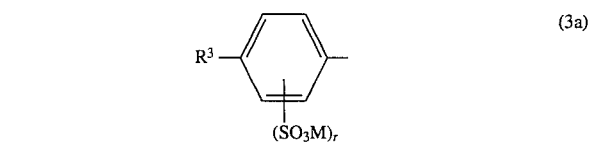
(3a)

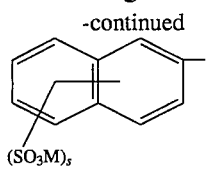

(3b)

in which

R³ is hydrogen, methoxy, ethoxy, methyl or ethyl,

M is as defined above, r is the number zero, 1 or 2 (where if r is zero this group is hydrogen) and s is the number 1, 2 or 3;

X is chlorine, fluorine, hydroxy, cyanoamino or alkylamino of 1 to 4 carbon atoms such as methylamino or ethylamino, preferably chlorine or fluorine;

m is the number zero or 1 (where if m is zero this group is hydrogen);

n is the number zero or 1 (where if n is zero this group is hydrogen);

p is the number zero or 1 (where if p is zero this group is hydrogen);

Z is chlorine or fluorine;

$R^A$ is chlorine, hydroxy, phenoxy, morpholino or a group of the formula (4a), (4b) or (4c)

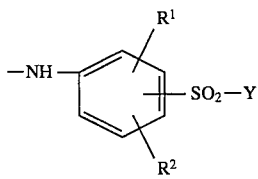

(4a)

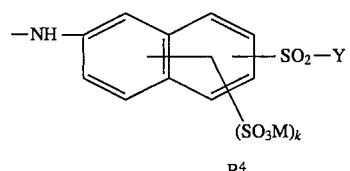

(4b)

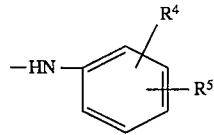

(4c)

in which $R^1$, $R^2$, Y, M and k has one of the meanings given above, $R^4$ is hydrogen, sulfo, carboxy, methyl, ethyl, methoxy, ethoxy or hydroxy, and $R^5$ is hydrogen, sulfo, methyl, ethyl, methoxy or ethoxy;

$R^B$ is a group of the formula (5a), (5b) or (5c)

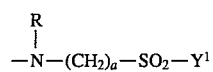

(5a)

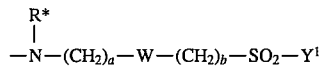

(5b)

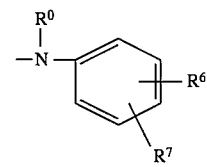

(5c)

in which $Y^1$ has one of the meanings given above,

R is hydrogen or phenyl which may be substituted by 1 or 2 substituents from the group consisting of methyl, ethyl, methoxy, ethoxy, sulfo and carboxy, or is alkyl of 1 to 4 carbon atoms such as ethyl or methyl, or is a group of the formula —$(CH_2)_a$—$SO_2$—$Y^1$ where $Y^1$ is as defined above and where a is the number 1, 2 or 3, a is the number 1, 2 or 3, b is the number 2 or 3, W is a group of the formula —O— or —NH—, R* is hydrogen or phenyl which may be substituted by 1 or 2 substituents from the group consisting of methyl, ethyl, methoxy, ethoxy, sulfo and carboxy, or is alkyl of 1 to 4 carbon atoms such as ethyl or methyl, or is a group of the formula —$(CH_2)_a$—W—$(CH_2)_b$—$SO_2$—$Y^1$ where a, b, W and $Y^1$ are as defined above, $R^o$ is hydrogen, methyl, ethyl or β-sulfoethyl, $R^6$ is hydrogen, methyl, ethyl, methoxy, ethoxy, sulfo, carboxy, hydroxy or a group of the formula —$(CH_2)_a$—$SO_2$—Y where Y and a are as defined above, and $R^7$ is hydrogen, methoxy, ethoxy or sulfo.

In formula (1) the groups —NH— attached to the triazine radical are preferably in position 1 on the respective 8-hydroxynaphthalene radical, with m and n each being 1 and these groups —$SO_3M$ each being attached in position 3 or 4 to the respective 8-hydroxynaphthalene radical; in formulae (2A), (2B) and (2C) p is preferably zero and the group —NH— is preferably in position 2 or 3, very preferably in position 3, on the 8-hydroxynaphthalene radical.

The individual formula components in the formulae mentioned above and likewise in those mentioned below, including those components which have the same designation within a general formula, may have definitions which are the same as or different from one another.

The dyes present in the mixtures of the invention are known (for example from German Offenlegungsschriften Nos. 27 48 965 and 27 48 966, Japanese Patent Application Publications Hei-2-073 870 and Hei-2-202 956 and Korean Patent No. 86/594) or can be prepared by analogy with the information given therein.

Alkali-eliminable substituents in the β-position of the ethyl group of Y or $Y^1$ are, for example, halogen atoms such as bromine and chlorine, ester groups of organic carboxylic and sulfonic acids, such as those of alkylcarboxylic acids, substituted or unsubstituted benzenecarboxylic acids and substituted or unsubstituted benzenesulfonic acids, such as alkanoyloxygroups of 2 to 5 carbon atoms, and among these especially acetyloxy, benzoyloxy, sulfobenzoyloxy, phenylsulfonyloxy and tolylsulfonyloxy, and also acid ester groups of inorganic acids, such as those of phosphoric acid, sulfuric acid and thiosulfuric acid (phosphato, sulfato and thiosulfato groups), as well as dialkylamino groups containing alkyl groups of 1 to 4 carbon atoms each, such as dimethylamino and diethylamino. Y is preferably β-sulfatoethyl or vinyl and is very preferably β-sulfatoethyl, and $Y^1$ is preferably β-sulfatoethyl, β-chloroethyl or vinyl and very preferably β-sulfatoethyl or vinyl.

The groups "sulfo", "carboxy", "thiosulfato", "phosphato" and "sulfato" include both the acid form thereof and the salt form thereof. Accordingly, sulfo groups are groups of the formula —$SO_3M$, carboxy groups are groups of the formula —COOM, thiosulfato groups are groups of the formula —S—$SO_3M$, phosphato groups are groups of the formula —$OPO_3M_2$ and sulfato groups are groups of the formula —$OSO_3M$, where M is as defined above.

Examples of radicals of the formulae (2a) and (2b) are 3-(β-sulfatoethylsulfonyl)phenyl, 4-(β-sulfatoethylsulfonyl)phenyl, 2-methyl-5-methoxy-4-(β-sulfatoethylsulfonyl)phenyl, 2-methoxy-5-(β-sulfatoethylsulfonyl)phenyl, 2,5-dimethoxy-4-(β-sulfatoethylsulfonyl)phenyl, 1-sulfo-6-(β-sulfatoethylsulfonyl)-2-naphthyl, 6-sulfo- 8-(β-sulfatoethylsulfonyl)-2-naphthyl, 8-sulfo- 6-(β-sulfatoethylsulfonyl)-2-naphthyl and the vinylsulfonyl and β-thiosulfatoethylsulfonyl derivatives thereof, and among these preferably 3-(β-sulfatoethylsulfonyl)phenyl, 4-(β-sulfatoethylsulfonyl)phenyl, 2-methoxy-5-(β-sulfatoethylsulfonyl)phenyl and 2,5-dimethoxy-4-(β-sulfatoethylsulfonyl)phenyl.

Examples of radicals of the formulae (4a), (4b) and (4c) are 3-(β-sulfatoethylsulfonyl)phenyl, 4-(β-sulfatoethylsulfonyl)phenyl, 2-methyl-5-methoxy-4-(β-sulfatoethylsulfonyl)phenyl, 2-methoxy-5-(β-sulfatoethylsulfonyl)phenyl, 2,5-dimethoxy-4-(β-sulfatoethylsulfonyl)phenyl, 1-sulfo-6-(β-sulfatoethylsulfonyl)-2-naphthyl, 6-sulfo- 8-(β-sulfatoethylsulfonyl)-2-naphthyl, 8-sulfo- 6-(β-sulfatoethylsulfonyl)-2-naphthyl and the vinylsulfonyl and β-thiosulfatoethylsulfonyl derivatives thereof, and also 4-hydroxy-3-sulfophenylamino, 3-sulfophenylamino, 4-sulfophenylamino and 2-methylphenylamino.

Examples of radicals of the formulae (5a), (5b) and (5c) are γ-(β-sulfatoethylsulfonyl)propylamino, N-phenyl-N-[γ-(β'-sulfatoethylsulfonyl)propyl]amino, β-(β'-chloroethylsulfonyl)ethylamino, N-phenyl-N-[β-(β'-sulfatoethylsulfonyl)ethyl]amino, N,N-bis[β-(β'-chloroethylsulfonyl)ethyl] amino, N,N-bis[β-(vinylsulfonyl)ethyl]amino, 3-(β-sulfatoethylsulfonyl)phenylamino, 4-(β-sulfatoethylsulfonyl)phenylamino, N-methylaniline and N-ethylaniline.

The dye mixtures of the invention preferably comprise the disazo dye(s) of the formula (1) in a quantity of from 90 to 50% by weight and the monoazo dye(s) of the formulae (2) in a quantity of from 10 to 50% by weight; furthermore, preferred dye mixtures comprising the dyes of the formulae (1) and (2) are those which comprise the disazo dye(s) of the formula (1) in a quantity of from 85 to 55% by weight and the monoazo dye(s) of the formulae (2) in a quantity of from 15 to 45% by weight.

The mixtures may also be shaded with a yellow or red dye in a quantity of up to 10% by weight, preferably up to 5% by weight. Examples of such known dyes are monoazo dyes of the formulae (a), (b), (c) and (d)

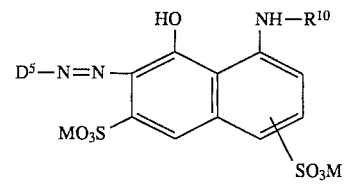

(a)

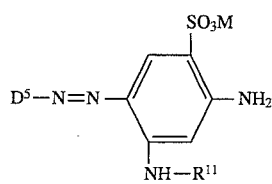

(b)

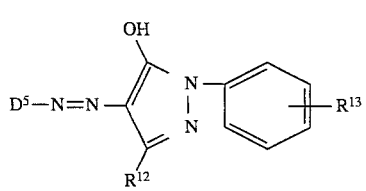

(c)

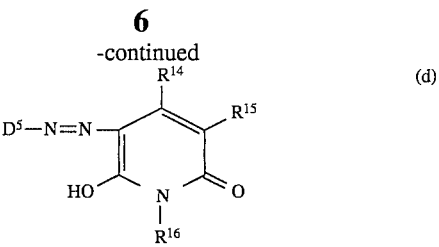

(d)

in which:

D⁵ is 3-(β-sulfatoethylsulfonyl)phenyl, 4-(β-sulfatoethylsulfonyl)phenyl, 3-vinylsulfonylphenyl, 4-vinylsulfonylphenyl, 2-methoxy-5-(β-sulfatoethylsulfonyl)phenyl or 2-methoxy-5-vinylsulfonylphenyl;

M is as defined above;

R¹⁰ is acetyl, benzoyl, 4,6-dicyanoamido-1,3,5-triazin- 2-yl, 4-cyanoamido-6-(sulfophenylamino)- 1,3,5-triazin-2-yl, 4-(N-morpholino)-6-(sulfophenylamino)- 1,3,5-triazin-2-yl or 4-(N-morpholino)- 6-(sulfophenylamino)1,3,5-triazin-2-yl which is substituted in the benzene ring by methyl or methoxy;

R¹¹ is acetyl, carbamoyl, 4,6-dicyanoamido- 1,3,5-triazin-2-yl, 4-cyanoamido-6-(sulfophenylamino)- 1,3,5-triazin-2-yl, 4-(N-morpholino)- 6-(sulfophenylamino)1,3,5-triazin-2-yl or 4-(N-morpholino)-6-(sulfophenylamino)1,3, 5-triazin- 2-yl which is substituted in the benzene ring by methyl or methoxy;

R¹² is methyl or carboxy;

R¹³ is sulfo, β-chloroethylsulfonyl or β-sulfatoethylsulfonyl;

R¹⁴ is hydrogen or methyl;

R¹⁵ is hydrogen, cyano, carbamoyl, carboxy or sulfomethyl;

R¹⁶ is methyl, ethyl or β-sulfoethyl.

The dyes of the formulae (1) and (2) may with the same chromophore possess a structure which differs in respect of the fiber-reactive groups —SO₂—Y and —SO₂—Y¹. In particular, the dye mixtures may contain dyes of the same chromophore which conform to the formula (1) and dyes of the same chromophore which conform to one of the formulae (2), in which the fiber-reactive groups —SO₂—Y and —SO₂—Y¹ are in one case vinylsulfonyl groups and in the other case β-chloroethylsulfonyl or thiosulfatoethylsulfonyl or, preferably, β-sulfatoethylsulfonyl groups. Where the dye mixtures contain the respective dye components in the form of a vinylsulfonyl dye, then the proportion of the respective vinylsulfonyl dye to the respective β-chloro- or β-thiosulfato- or sulfatoethylsulfonyl dye is up to about 30 mol % based on the respective dye chromophore.

Preference is given in this context to those dye mixtures in which the proportion of the vinylsulfonyl dyes to the β-sulfatoethylsulfonyl dyes represents a molar ratio of between 5:95 and 30:70.

Among the disazo dyes of the formula (1), preference is given to dyes of the formula (1a)

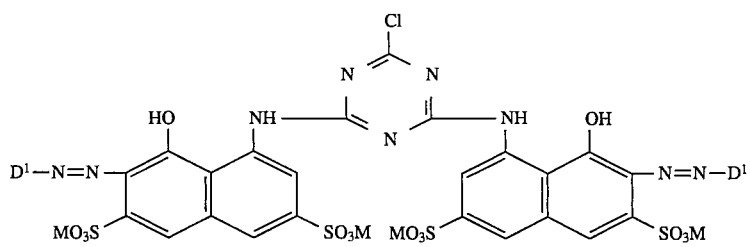

(1a)

in which $D^1$ is in each case one of the groups described above for formulae (2a) and (2b), especially the preferred groups.

Among the dyes of the formula (2A), preference is given to those in which $D^3$ is 2-methoxy-5-(β-sulfatoethylsulfonyl)phenyl or 2,5-dimethoxy-4-(β-sulfatoethylsulfonyl)phenyl or the vinylsulfonyl derivative of such a group, p is zero, the triazinylamino group is attached in position 2 or 3, preferably in position 3, to the 8-naphthol radical, Z is chlorine or preferably fluorine and $R^A$ is chlorine, morpholino or a group of the above-mentioned formula (4c) in which $R^4$ is hydrogen, sulfo, methyl or methoxy and $R^5$ is hydrogen, sulfo or methyl.

Preferred dye mixtures are those comprising one or more disazo dyes of the formula (1) in which m and n are as defined above, X is chlorine and $D^1$ and $D^2$ are identical to or different from one another and are a radical as just mentioned for the formula radical (2a) or (2b), and comprising one or more monoazo dyes of the formula (2A) in which m and p are as defined above, $D^3$ is 3- or 4-(β-thiosulfatoethylsulfonyl)phenyl or 3- or 4-(vinylsulfonyl)phenyl or 3- or 4-(β-sulfatoethylsulfonyl)phenyl, Z is chlorine and $R^A$ is chlorine or 4-hydroxy-3-sulfophenylamino, where if both vinylsulfonyl and β-sulfatoethylsulfonyl groups are present in the dye mixtures the molar ratio of the vinylsulfonyl portions to the β-sulfatoethylsulfonyl portions is between 5:95 and 30:70.

Further preference is given to dye mixtures comprising one or more dyes of the formula (1) having the abovementioned, especially preferred, meaning and comprising one or more dyes of the formula (2C) in which D is 1,5-disulfo-2-naphthyl or 4-methyl-2-sulfophenyl, Z is fluorine and $R^B$ is γ-(β'-sulfatoethylsulfonyl)propylamino, N-phenyl-N-γ-(β'-sulfatoethylsulfonyl)propylamino, N-phenyl-β-(β'-sulfatoethylsulfonyl)ethylamino, bis[β-(β'-chloroethylsulfonyl)ethyl]amino, 3-(β-sulfatoethylsulfonyl)phenylamino, N-methylphenylamino, N-ethylphenylamino or (β-sulfatoethylsulfonyl)oxyethylamino, where if both vinylsulfonyl and β-chloroethylsulfonyl or β-sulfatoethylsulfonyl groups are present in the dye mixtures the molar ratio of the vinylsulfonyl portions to the β-chloroethylsulfonyl or β-sulfatoethylsulfonyl portions is between 5:95 and 30:70.

Further preference is given to dye mixtures comprising one or more dyes of the formula (1) of the above-mentioned, especially preferred, meaning and comprising one or more dyes of the formula (2B) in which the radical $D^3$ is 2-methoxy-5-(β-sulfatoethylsulfonyl)phenyl, 2,5-dimethoxy-4-(β-sulfatoethylsulfonyl)phenyl or 2-methoxy-5-vinylsulfonylphenyl, M and p are as defined above, Z is fluorine and $R^4$ is morpholino, 3-sulfophenylamino, phenoxy or 2-methylphenylamino, where if both vinylsulfonyl and β-sulfatoethylsulfonyl groups are present in the dye mixtures the molar ratio of the vinylsulfonyl portions to the β-sulfatoethylsulfonyl portions is between 5:95 and 30:70.

As preparations the dye mixtures according to the invention may be in solid or in liquid (dissolved) form. In solid form they generally contain the electrolyte salts customary in the case of water-soluble and in particular fiber-reactive dyes, such as sodium chloride, potassium chloride and sodium sulfate, and may also contain the assistants customary in commercial dyes, such as buffer substances capable of establishing a pH in aqueous solution of between 3 and 7, such as sodium acetate, sodium borate, sodium hydrogen carbonate, sodium dihydrogen phosphate and disodium hydrogen phosphate, small quantities of siccatives or, if they are in liquid aqueous solution (including the presence of thickeners of the type customary in print pastes), substances which ensure the permanence of these preparations, for example mold preventatives.

In general the dye mixtures take the form of dye powders containing from 10 to 80% by weight, based on the dye powder or preparation, of a strength-standardizing diluent electrolyte salt. These dye powders may in addition contain the abovementioned buffer substances in an overall quantity of up to 5%, based on the dye powder. If the dye mixtures of the invention are present in aqueous solution, the content of the mixtures of the invention in these aqueous solutions is between 0.1 and 55% by weight, generally between 5 and 50% by weight, the electrolyte salt content in these aqueous solutions preferably being below 10% by weight based on the aqueous solution; the aqueous solutions (liquid preparations) generally contain the abovementioned buffer substances in a quantity of from 0.1 to 5% by weight, preferably from 0.3 to 2% by weight.

The dye mixtures of the invention can be prepared in a conventional manner, for instance by mechanically mixing the individual dyes in the required proportions or, if $D^2$ and $D^3$ are the same as $D^1$, by synthesis by means of the customary diazotization and coupling reactions using appropriate mixtures of the diazo and coupling components in a manner familiar to those skilled in the art, and the necessary proportions. One option, for example, is to react together aqueous solutions of two appropriate coupling components, for instance a bis(mono- or disulfohydroxynaphthylamino)chlorotriazine as coupling component of the dyes of the formula (1) and a coupling component of the formula (6)

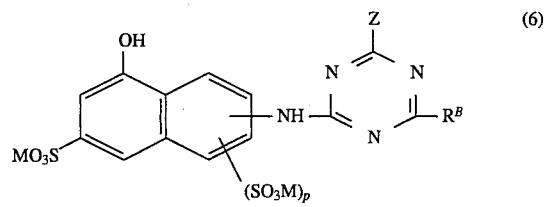

(6)

where M, p, Z and $R^B$ are as defined above, and aqueous solutions or suspensions of the diazo components of the compounds of the formula $D^1$—NH where $D^1$ is as defined above, in the appropriate proportions, at a pH of between 3 and 6 (this reaction is known as coupling). The resulting dye mixture can be isolated from the solution in a conventional manner, for example by salting out with an electrolyte salt such as sodium chloride, potassium chloride or lithium chloride, or by spray drying.

If the dye mixtures of the invention are produced by mechanical mixing of the individual dyes, then any strength-standardizing diluents, dedusting agents or further auxiliaries which are conventional in dyeing or in the dye preparations used for this purpose are added in the course of mixing.

Dye mixtures in which the dye chromophores contain for example not only a β-chloroethylsulfonyl or β-thiosulfatoethylsulfonyl or β-sulfatoethylsulfonyl group but also portions containing vinylsulfonyl groups can be prepared not only by the method indicated above, by the use of corresponding vinylsulfonyl starting anilines, but also by reacting the dye mixture in which Y and/or $Y^1$ are a β-chloroethyl, β-thiosulfatoethyl or β-sulfatoethyl radical with a quantity of alkali required for only part of these groups and converting some of the β-substituted ethylsulfonyl groups mentioned into the vinylsulfonyl groups. This measure is carried out in accordance with generally known methods for the conversion of β-substituted ethylsulfonyl groups to the vinylsulfonyl group.

The dye mixtures of the invention comprising the dyes of the formulae (1) and (2) dye hydroxy- and/or carboxamido-containing fiber materials by the application and fixing methods described on numerous occasions in the art for fiber-reactive dyes in orange to red shades with good color buildup and good washoff capacity in respect of unfixed dye portions. Moreover, the dyeings obtained are readily dischargeable. In addition to this, the mixtures are highly suitable as combination dyes in combination dyeing with other dyes.

The present invention therefore also provides for the use of the dye mixtures of the invention for dyeing (including printing and combination dyeing) hydroxy- and/or carboxamido-containing fiber materials and processes for dyeing such fiber materials using a dye mixture according to the invention by applying the dye mixture in dissolved form to the substrate and fixing the dyes on the fiber by the action of an alkali or by heat or by means of both measures.

Hydroxy-containing materials are natural or synthetic hydroxy-containing materials, for example cellulose fiber materials, including in the form of paper, or their regenerated products and polyvinyl alcohols. Cellulose fiber materials are preferably cotton but can also be other vegetable fibers, such as linen, hemp, jute and ramie fibers; regenerated cellulose fibers are for example staple viscose and filament viscose.

Examples of carboxamido-containing materials are synthetic and natural polyamides and polyurethanes, especially in the form of fibers, for example wool and other animal hairs, silk, leather, nylon 6.6, nylon 6, nylon 11 and nylon 4.

The application of the dye mixtures of the invention is by generally known processes for dyeing and printing fiber materials by the known application techniques for fiber-reactive dyes. Since the dyes in the dye mixtures of the invention are highly compatible with one another, the dye mixtures of the invention can also be employed with advantage in exhaust dyeing processes. Applied in this way by exhaust dyeing processes for example to cellulose fibers from a long liquor at temperatures of between 40° and 105° C., if desired at temperatures of up to 130° C. under superatmospheric pressure, and if desired in the presence of conventional dyeing assistants with the use of acid-binding agents and, if desired, neutral salts such as sodium chloride or sodium sulfate, they produce dyeings in very good color yields and with excellent color buildup and consistent shade. One possible procedure is to introduce the material into the warm bath, to gradually heat the bath to the desired dyeing temperature and to complete the dyeing process at this temperature. The neutral salts which speed up the exhaustion of the dyes can also, if desired, not be added to the bath until the actual dyeing temperature has been reached.

Similarly, the conventional printing processes or cellulose fibers—which can either be carried out in single phase, for example by printing with a print paste containing sodium bicarbonate or another acid-binding agent and the colorant and subsequent steaming at from 100° to 103° C., or in two phases, for example by printing with a neutral or weakly acid print paste containing the colorant and subsequent fixation either by passing the printed material through a hot electrolyte-containing alkaline bath or by overpadding with an alkaline electrolyte-containing padding liquor and subsequent batching with this treated material or subsequent steaming or subsequent treatment with dry heat—produce strong prints with well-defined contours and a clear white ground. A change in fixing conditions has only little effect on the outcome of the prints. Not only in dyeing but also in printing the degrees of fixation obtained with the dye mixtures of the invention are very high. In dry-heat fixing by the customary thermofix processes the hot air used has a temperature of from 120° to 200° C. In addition to the customary steam from 101° to 103° C. it is also possible to employ superheated steam and high-pressure steam at temperatures of up to 160° C.

Examples of the acid-binding agents responsible for fixing the dyes to the cellulose fibers are water-soluble basic salts of alkali metals and of alkaline earth metals of inorganic or organic acids, and also compounds which release alkali under hot conditions. Particular mention may be made of the alkali metal hydroxides and alkali metal salts of weak to medium-strength inorganic or organic acids, the preferred alkali metal compounds being the sodium and potassium compounds. Examples of such acid-binding agents are sodium hydroxide, potassium hydroxide, sodium carbonate, sodium bicarbonate, potassium carbonate, sodium formate, sodium dihydrogen phosphate and disodium hydrogen phosphate.

The treatment of the dyes of the dye mixtures of the invention with the acid-binding agents with or without the action of heat bonds the dyes chemically to the cellulose fiber; the dyeings on cellulose in particular, after they have been given the usual aftertreatment of rinsing to remove unfixed dye portions, exhibit excellent wet fastness properties, especially since the unfixed dye portions are readily washed off because of their good cold-water solubility.

The dyeings on polyurethane and polyamide fibers are customarily carried out from an acid medium. The dyebath may thus contain, for example, acetic acid and/or ammonium sulfate or acetic acid and ammonium acetate or sodium acetate, added to bring it to the desired pH. To obtain a dyeing of serviceable levelness it is advisable to add customary leveling assistants, for example those based on a reaction product of cyanuric chloride with three times the molar quantity of an aminobenzenesulfonic acid or aminonaphthalenesulfonic acid or based on a reaction product of, for example, stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at a temperature of between 60° and 98° C. However, the dyeings can also be carried out at boiling temperature or at temperatures of up to 120° C. (under superatmospheric pressure).

The Examples which follow serve to illustrate the invention. Parts and percentages are by weight unless stated otherwise. Parts by weight bear the same relation to parts by volume as the kilogram to the liter.

EXAMPLE 1

440 parts of an electrolyte-containing dye powder which contains the red disazo dye of the formula (A)

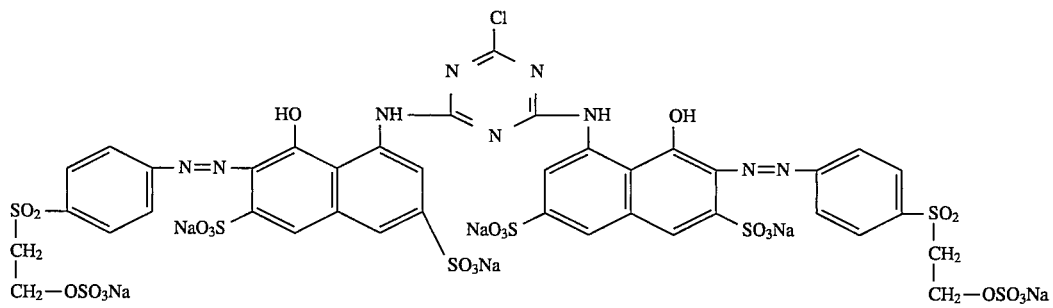
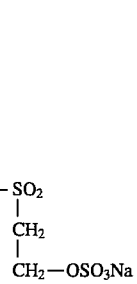

(A)

(known from Example i of German Patent 2 748 965) in a proportion of 50% are mixed with 72.6 parts of an electrolyte-containing dye powder which contains the orange monoazo dye of the formula (B)

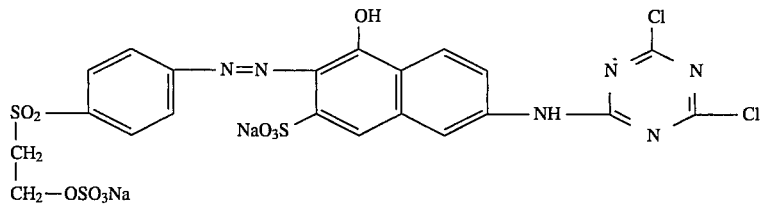
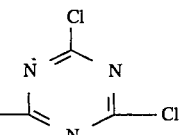

(B)

in a proportion of 50% in a mechanical mixer. The resulting dye mixture of the invention, when employed according to the application and fixing methods customary in the art for fiber-reactive dyes, produces on cellulose fibers, for example, dyeings and prints in deep orange shades.

EXAMPLE 2

In order to prepare a dye mixture of the invention a suspension of 288 parts of 4-(β-sulfatoethylsulfonyl)aniline in 250 parts of water is adjusted to a pH of from 4.5 to 5 with about 59 parts of sodium carbonate, the aniline compound is diazotized with 186 parts by volume of a 38% strength aqueous solution of sodium nitrite following addition of 234 parts by volume of a 30% strength aqueous hydrochloric acid and 400 parts of ice, then 300 parts of 2,4-bis[(8-hydroxy-3,6-disulfo- 2-naphthyl)amino]-6-chloro-1,3,5-triazine and 232 parts of 6-(4,6-dichlorotriazin-2-yl)amino-1-hydroxynaphtthalene- 3-sulfonic acid are added, the mixture is adjusted to a pH of from 5 to 6 by means of sodium carbonate and the coupling reaction is carried out within this pH range at 20° C. The result is a dye solution comprising the dyes of the formulae (A) and (B) mentioned in Example 1 in a ratio of 40:60. This dye solution can be adjusted to a pH of 4.5 by addition of 5 parts of sodium phosphate buffer. By further diluting with water or by evaporating the solution, this liquid dye mixture can then be standardized to the desired strength for a liquid preparation, which in a conventional manner is used either directly as a dyebath or dyeing liquor, after addition if desired of the corresponding quantity of an alkaline agent, or can be used to prepare a dyebath or dyeing liquor. This dye mixture produces deep orange dyeings.

EXAMPLE 3

586.4 parts of an electrolyte-containing dye powder which contains the red disazo dye of the formula (A) indicated in Example 1 in a proportion of 50% are mixed in a mechanical mixer with 75 parts of an electrolyte-containing dye powder which contains the orange monoazo dye of the formula (C)

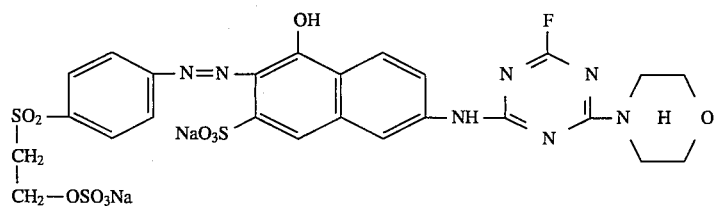

(C)

in a proportion of 50%. The resulting dye mixture of the invention, when employed according to the application and fixing methods customary in the art for fiber-reactive dyes, produces on cellulose fiber materials, for example, strong dyeings and prints in deep orange shades.

EXAMPLE 4

146.6 parts of an electrolyte-containing dye powder which contains the red disazo dye of the formula (A) indicated in Example 1 in a proportion of 50% are mixed in a mechanical mixer with 86.5 parts of an electrolyte-containing dye powder which contains the orange monoazo dye of the formula (D)

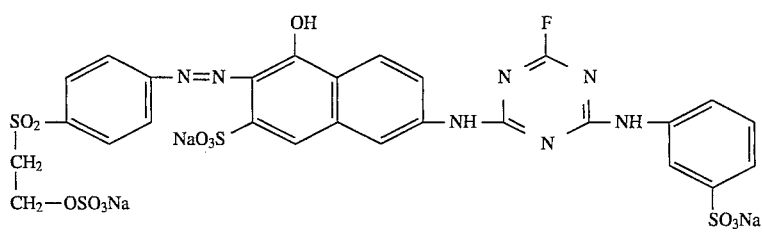

(known from Example 56 of published European Patent Application No. 0 040 806) in a proportion of 50%. The resulting dye mixture of the invention, when employed according to the application and fixing methods customary in the art for fiber-reactive dyes, produces on cellulose fiber materials, for example, strong dyeings and prints in deep orange shades.

EXAMPLE 5

152.6 parts of an electrolyte-containing dye powder which contains the red disazo dye of the formula (E)

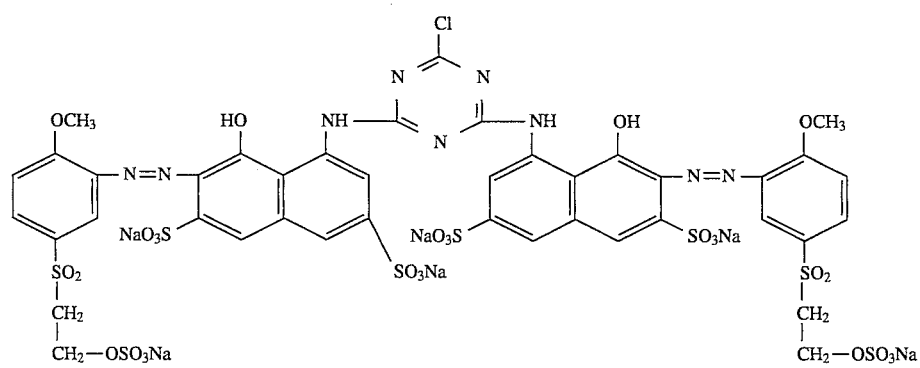

(known from Example 4 of German Patent 2 748 965) in a proportion of 50% are mixed in a mechanical mixer with 29.0 parts of an electrolyte-containing dye powder which contains the orange monoazo dye of the formula (B) indicated in Example 1 in a proportion of 50%. The resulting dye mixture of the invention, when employed according to the application and fixing methods customary in the art for fiber-reactive dyes, produces on cellulose fiber materials, for example, dyeings and prints in deep orange shades.

EXAMPLE 6

177 parts of an electrolyte-containing dye powder which contains the red disazo dye of the formula (F)

21.8 parts of an electrolyte-containing dye powder which contains the orange monoazo dye of the formula (B) indicated in Example 1 in a proportion of 50%. The resulting dye mixture of the invention, when employed by the application and fixing methods customary in the art for fiber-reactive dyes, produces on cellulose fiber materials, for example, dyeings and prints in deep orange shades.

EXAMPLES 7 TO 28

The following Tabular Examples describe further dye mixtures of the invention comprising the dye of the formula (A) and a dye of the formula (G)

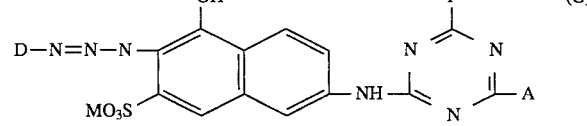

in which M is as defined earlier and the radicals D and A are as defined in the particular Tabular Examples. These dye mixtures, when employed according to the application and fixing methods customary in the art for fiber-reactive dyes produce on the fiber materials mentioned in the description, for example cellulose fiber materials, strong level dyeings

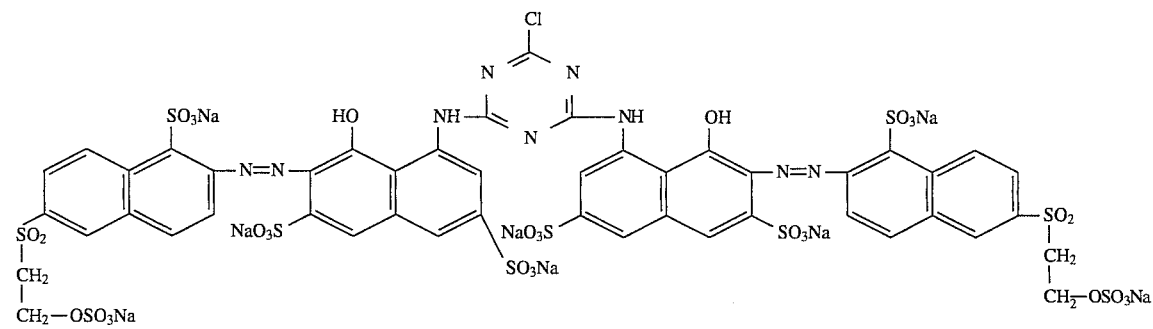

(known from Example 4 of German Patent 2 748 965) in a proportion of 50% are mixed in a mechanical mixer with having the shade indicated in the particular Tabular Example (in this case on cotton).

| Ex. | Dye of the formula (G) Radical D | Radical A | Ratio of (A):(G) in the mixture, in % by weight | Shade |
|---|---|---|---|---|
| 7 | 1,5-disulfo-2-naphthyl | γ-(β'-sulfatoethylsulfonyl)propylamino | 75:25 | red |
| 8 | 1,5-disulfo-2-naphthyl | γ-(β'-sulfatoethylsulfonyl)propylamino | 50:50 | orange |
| 9 | 1,5-disulfo-2-naphthyl | γ-(β'-sulfatoethylsulfonyl)propylamino | 65:35 | red-orange |
| 10 | 1,5-disulfo-2-naphthyl | N-phenyl-N-[γ-(β'-sulfatoethylsulfonyl)-propyl]amino | 55:45 | orange |
| 11 | 1,5-disulfo-2-naphthyl | N-phenyl-N-[γ-(β'-sulfatoethylsulfonyl)-propyl]amino | 70:30 | red |
| 12 | 1,5-disulfo-2-naphthyl | N-phenyl-N-[β-(β'-sulfatoethylsulfonyl)-ethyl]amino | 60:40 | orange |
| 13 | 1,5-disulfo-2-naphthyl | N-phenyl-N-[β-(β'-sulfatoethylsulfonyl)-ethyl]amino | 75:25 | red |
| 14 | 1,5-disulfo-2-naphthyl | N,N-bis-[β-(β'-chloroethylsulfonyl)-ethyl]-amino | 60:40 | orange |
| 15 | 1,5-disulfo-2-naphthyl | N,N-bis-[β-(β'-chloroethylsulfonyl)-ethyl]-amino | 65:35 | red |
| 16 | 1,5-disulfo-2,naphthyl | N,N-bis(β-vinylsulfonylethyl)amino | 60:40 | orange |
| 17 | 1,5-disulfo-2-naphthyl | N,N-bis(β-vinylsulfonylethyl)amino | 50:50 | orange |
| 18 | 1,5-disulfo-2-naphthyl | 3-(β-sulfatoethylsulfonyl)phenylamino | 60:40 | orange |
| 19 | 4-methyl-2-sulfophenyl | γ-(β'-sulfatoethylsulfonyl)propylamino | 75:25 | red |
| 20 | 4-methyl-2-sulfophenyl | N-phenyl-N-[γ-(β'-sulfatoethylsulfonyl)-propyl]amino | 60:40 | orange |
| 21 | 4-methyl-2-sulfophenyl | N-phenyl-N-[γ-(β'-sulfatoethylsulfonyl)-propyl]amino | 75:25 | red |
| 22 | 4-methyl-2-sulfophenyl | N-phenyl-N-[β-(β'-sulfatoethylsulfonyl)-ethyl]amino | 60:40 | orange |
| 23 | 4-methyl-2-sulfophenyl | N-phenyl-N-[β-(β'-sulfatoethylsulfonyl)-ethyl]amino | 70:30 | scarlet |
| 24 | 4-methyl-2-sulfophenyl | N,N-bis-[β-(β'-chloroethylsulfonyl)ethyl]-amino | 60:40 | orange |
| 25 | 4-methyl-2-sulfophenyl | N,N-bis-[β-(β'-chloroethylsulfonyl)ethyl]-amino | 75:25 | red |
| 26 | 4-methyl-2-sulfophenyl | N,N-bis(β-vinylsulfonylethyl)amino | 65:35 | red-orange |
| 27 | 4-methyl-2-sulfophenyl | N,N-bis(β-vinylsulfonylethyl)amino | 75:25 | red |
| 28 | 4-methyl-2-sulfophenyl | amino 3-(β-sulfatoethylsulfonyl)phenylamino | 60:40 | orange |

We claim:

1. A dye mixture comprising one or more disazo dyes of the formula (1) and one or more monoazo dyes of the formula (2A) or (2B) or (2C) or a mixture of these monoazo dyes in a ratio of the dyes (1) to the dyes (2A), (2B) and (2C) of from 95 to 50% by weight: from 5 to 50% by weight:

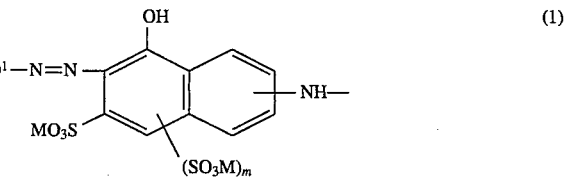

(1)

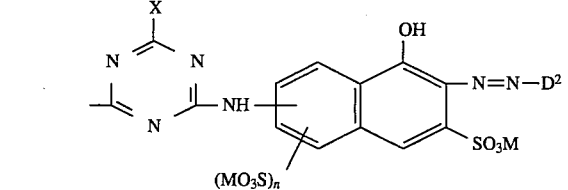

(2A)

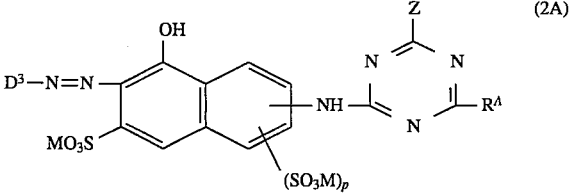

(2B)

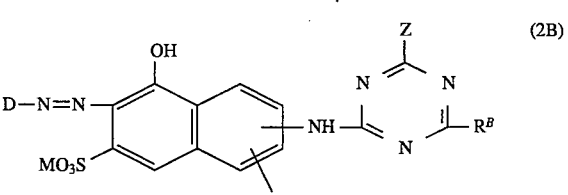

(2C)

in which:

M is hydrogen or an alkali metal;

$D^1$ is a group of the formula (2a) or (2b)

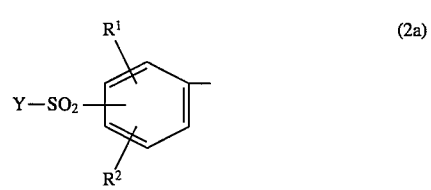

(2a)

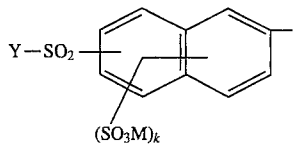 (2b)

in which

R¹ is hydrogen, methyl, ethyl, methoxy, ethoxy, sulfo or carboxy,

R² is hydrogen, methyl, ethyl, methoxy, ethoxy or sulfo,

Y is vinyl or is ethyl containing in the β-position a substituent which can be eliminated by alkali to form the vinyl group, M is as defined above, and k is the number zero, 1 or 2 (where if k is zero this group is hydrogen);

D² has one of the meanings given for D¹;
D³ has one of the meanings given for D¹;
D is a group of the formula (3a) or (3b)

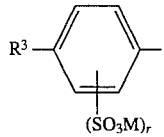 (3a)

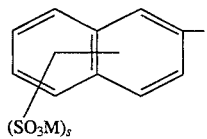 (3b)

in which

R³ is hydrogen, methoxy, ethoxy, methyl or ethyl,

M is as defined above, r is the number zero, 1 or 2 (where if r is zero this group is hydrogen) and s is the number 1, 2 or 3;

X is chlorine, fluorine, hydroxy, cyanoamino or alkylamino of 1 to 4 carbon atoms;

m is the number zero or 1 (where if m is zero this group is hydrogen);

n is the number zero or 1 (where if n is zero this group is hydrogen);

p is the number zero or 1 (where if p is zero this group is hydrogen);

Z is chlorine or fluorine;

R⁴ is chlorine, hydroxy, phenoxy, morpholino or a group of the formula (4a), (4b) or (4c)

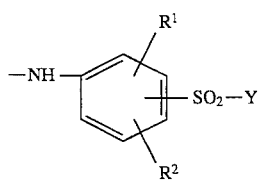 (4a)

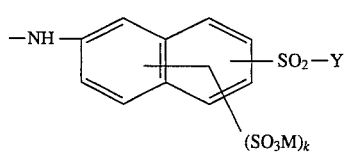 (4b)

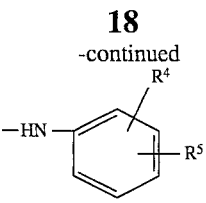 (4c)

in which

R¹, R², Y, M and k are as defined above,

R⁴ is hydrogen, sulfo, carboxy, methyl, ethyl, methoxy, ethoxy or hydroxy, and

R⁵ is hydrogen, sulfo, methyl, ethyl, methoxy or ethoxy;

$R^B$ is a group of the formula (5a), (5b) or (5c)

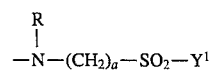 (5a)

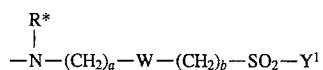 (5b)

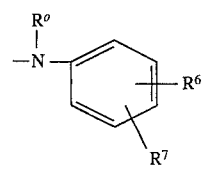 (5c)

in which

Y¹ is vinyl or is ethyl substituted in the β-position by an alkali-eliminable substituent, the substituent being selected from alkanoyloxy of 2 to 5 carbon atoms, benzoyloxy, sulfobenzoyloxy, phenylsulfonyloxy, tolylsulfonyloxy, phosphato, sulphato, thiosulphato and dialkylamino with alkyls of 1 to 4 carbon atoms, R is hydrogen or phenyl unsubstituted or substituted by 1 or 2 substituents from the group consisting of methyl, ethyl, methoxy, ethoxy, sulfo and carboxy, or is alkyl of 1 to 4 carbon atoms, or is a group of the formula —(CH₂)ₐ—SO₂—Y¹ where Y¹ is as defined above and a is the number 1, 2 or 3, a is the number 1, 2 or 3, b is the number 2 or 3, W is a group of the formula —O— or —NH—, R* is hydrogen or phenyl unsubstituted or substituted by 1 or 2 substituents from the group consisting of methyl, ethyl, methoxy, ethoxy, sulfo and carboxy, or is alkyl of 1 to 4 carbon atoms or is a group of the formula —(CH₂)ₐ—W—(CH₂)ᵦ—SO₂—Y¹ where a, b, W and Y¹ are as defined above Ro is hydrogen, methyl, ethyl or β-sulfoethyl, R⁶ is hydrogen, methyl, ethyl, methoxy, ethoxy, sulfo, carboxy, hydroxy or a group of the formula —(CH₂)ₐ—SO₂—Y where Y and a are as defined above, and R⁷ is hydrogen, methoxy, ethoxy or sulfo.

2. A dye mixture as claimed in claim 1, comprising the dye(s) of the formula (1) and the dye(s) of the formulae (2A), (2B), and (2C) in a ratio of 90–50:10–50% by weight.

3. A dye mixture as claimed in claim 1, wherein the radical X in the dye of the formula (1) is chlorine.

4. A dye mixture as claimed in claim 1, wherein the dye of the formula (1) is a dye of the formula (1a)

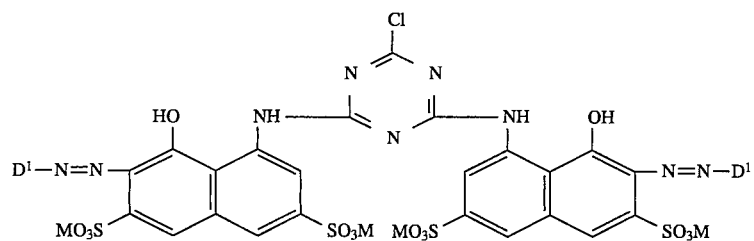
(1a)
in which M is as defined in claim 1 and $D^1$ is in each case 3-(β-sulfatoethylsulfonyl)phenyl, 4-(β-sulfatoethylsulfonyl)phenyl, 2-methoxy- 5-(β-sulfatoethylsulfonyl)phenyl or 2,5-dimethoxy- 4-(β-sulfatoethylsulfonyl)phenyl.
5. A dye mixture as claimed in claim 1, wherein Y and $Y^1$ are identical to or different from one another and are each vinyl or β-sulfatoethyl.
* * * * *